US010767725B2

(12) United States Patent
Amruthnath

(10) Patent No.: US 10,767,725 B2
(45) Date of Patent: Sep. 8, 2020

(54) AMPLITUDE-MODULATING VIBRATOR FOR PREDICTIVE MAINTENANCE MODELING

(71) Applicant: DENSO International America, Inc., Southfield, MI (US)

(72) Inventor: Nagdev Amruthnath, Kalamazoo, MI (US)

(73) Assignee: DENSO INTERNATIONAL AMERICA, INC., Southfield, MI (US)

( * ) Notice: Subject to any disclaimer, the term of this patent is extended or adjusted under 35 U.S.C. 154(b) by 266 days.

(21) Appl. No.: 16/045,001

(22) Filed: Jul. 25, 2018

(65) Prior Publication Data

US 2020/0032874 A1 Jan. 30, 2020

(51) Int. Cl.
*F16F 15/123* (2006.01)
*G01M 7/02* (2006.01)
*F16F 15/04* (2006.01)
*G01M 5/00* (2006.01)
*B06B 1/16* (2006.01)

(52) U.S. Cl.
CPC .......... *F16F 15/1236* (2013.01); *F16F 15/04* (2013.01); *G01M 5/0033* (2013.01); *G01M 7/025* (2013.01); *B06B 1/163* (2013.01); *B06B 1/164* (2013.01)

(58) Field of Classification Search
CPC ........... B06B 1/164; B06B 1/14; B06B 1/161; B06B 1/166; G01M 7/02; Y10T 74/10
USPC ................................... 73/577, 579, 582, 583
See application file for complete search history.

(56) References Cited

U.S. PATENT DOCUMENTS

| 2,247,978 | A | * | 7/1941 | Van Arkel | B01F 11/0031 366/110 |
|---|---|---|---|---|---|
| 3,145,012 | A | | 8/1964 | Kfoury | |
| 3,233,474 | A | * | 2/1966 | Ross | B06B 1/166 74/87 |
| 3,323,764 | A | | 6/1967 | Johnson | |
| 3,387,499 | A | * | 6/1968 | Bruderlein | G01M 7/04 74/61 |
| 3,428,279 | A | | 2/1969 | Johnson | |
| 3,467,350 | A | | 9/1969 | Tyler | |

(Continued)

FOREIGN PATENT DOCUMENTS

| CN | 108593269 A1 | * | 9/2018 |
|---|---|---|---|
| CN | 110186700 A1 | * | 8/2019 |
| KR | 101546353 B1 | | 8/2015 |

*Primary Examiner* — David A. Rogers
(74) *Attorney, Agent, or Firm* — Brooks Kushman P.C.

(57) ABSTRACT

A vibration device for generating various vibration signatures or characteristics is provided. This various vibration signatures or characteristics allow a single vibration device to be used to test and replicate failures in a subject device across a broad range of vibration signatures or characteristics transferring to the subject device. The vibration devices includes a pair of spaced-apart plates, each defining a slot therein. An adjustable fastener connects the upper and lower plates and extends through the upper and lower elongated slots. A vibrator is fastened to the upper plate via the upper elongated slot. To enable the vibration signatures or characteristics to be varied, the fastener is adjustable in a vertical direction to alter the distance between the lower plate and the upper plate, and is adjustable in a horizontal direction along the upper and lower slots. The motor can also translate along the upper elongated slot.

20 Claims, 4 Drawing Sheets

(56) References Cited

U.S. PATENT DOCUMENTS

| | | | | |
|---|---|---|---|---|
| 3,703,236 A | * | 11/1972 | Spurlin | B02C 19/16 209/326 |
| 3,762,694 A | | 10/1973 | MacDonnell | |
| 3,767,168 A | * | 10/1973 | Dupre | B22C 11/00 366/111 |
| 4,381,673 A | * | 5/1983 | Klauba | C21D 10/00 148/558 |
| 4,619,532 A | * | 10/1986 | Schmidt, III | B01F 11/0031 366/110 |
| 4,968,359 A | * | 11/1990 | Hebel, Jr. | C21D 10/00 148/558 |
| 4,972,930 A | * | 11/1990 | Davis | F16F 7/1017 188/379 |
| 5,242,512 A | * | 9/1993 | Bagley | G01N 29/12 148/558 |
| 5,252,152 A | * | 10/1993 | Seror | C21D 10/00 148/558 |
| 5,347,507 A | | 9/1994 | Kuhn | |
| 5,520,052 A | * | 5/1996 | Pechersky | G01H 9/00 73/579 |
| 5,608,693 A | * | 3/1997 | Richards | B01F 11/0005 366/114 |
| 5,833,362 A | * | 11/1998 | Shepard | B01F 11/0008 366/111 |
| 6,026,687 A | * | 2/2000 | Jury | G01H 13/00 73/579 |
| 6,213,630 B1 | * | 4/2001 | Kossmann | B06B 1/162 366/128 |
| 6,250,792 B1 | * | 6/2001 | Krush | B01F 3/18 366/128 |
| 6,252,768 B1 | | 6/2001 | Lin | |
| 6,263,750 B1 | * | 7/2001 | Maurer | B06B 1/14 366/128 |
| 6,321,610 B1 | * | 11/2001 | Sekiguchi | B06B 1/166 425/456 |
| 6,462,635 B1 | * | 10/2002 | Noe | B06B 1/14 335/271 |
| 7,132,817 B2 | * | 11/2006 | Noe | B06B 1/166 322/29 |
| 7,458,556 B1 | | 12/2008 | Manucy | |
| 7,549,336 B2 | * | 6/2009 | Masyada | G01N 29/045 73/579 |
| 7,571,817 B2 | | 8/2009 | Scott et al. | |
| 7,866,878 B2 | * | 1/2011 | Howe | B06B 1/161 366/108 |
| 8,480,052 B2 | | 7/2013 | Taylor et al. | |
| 8,914,154 B2 | | 12/2014 | Stothers et al. | |
| D777,015 S | | 1/2017 | Deveci | |
| 9,863,839 B2 | * | 1/2018 | Proulx | G01M 7/02 |
| 2003/0201237 A1 | | 10/2003 | Grichar et al. | |
| 2003/0210519 A1 | | 11/2003 | Wubs | |
| 2012/0175489 A1 | | 7/2012 | Taylor et al. | |
| 2014/0191104 A1 | | 7/2014 | Meisel et al. | |
| 2015/0233680 A1 | | 8/2015 | Pepka | |
| 2015/0323414 A1 | * | 11/2015 | In | G09B 9/04 73/11.07 |

* cited by examiner

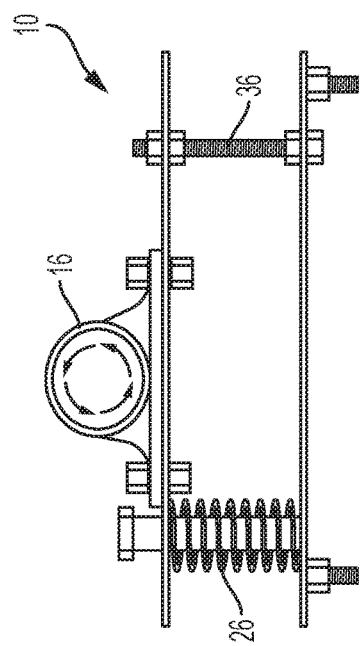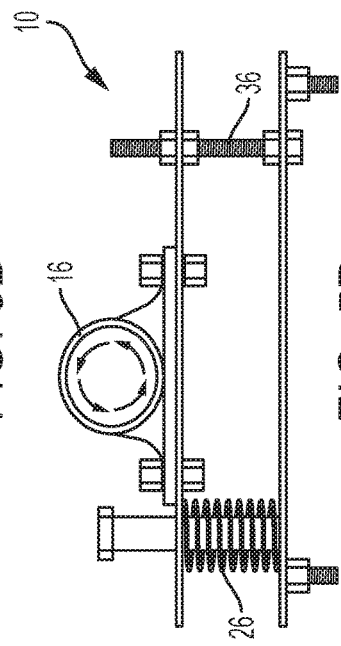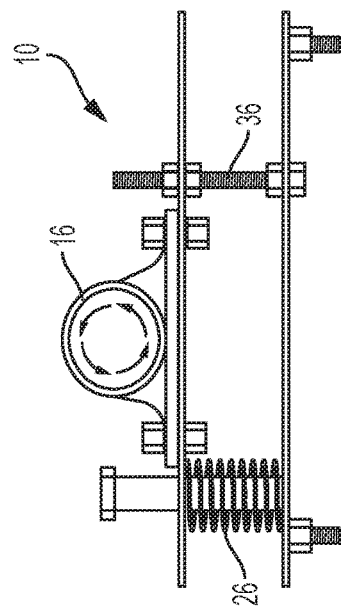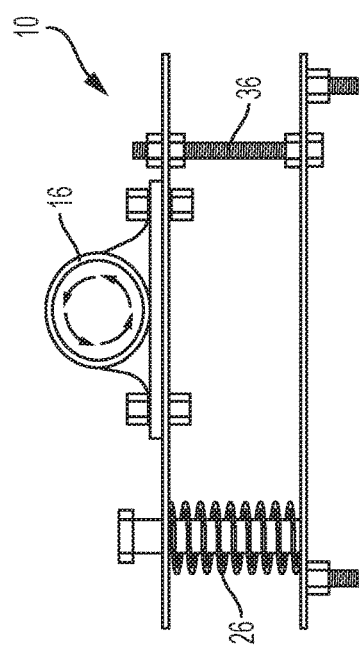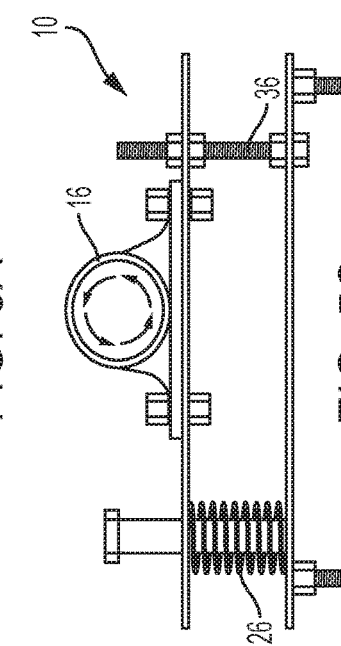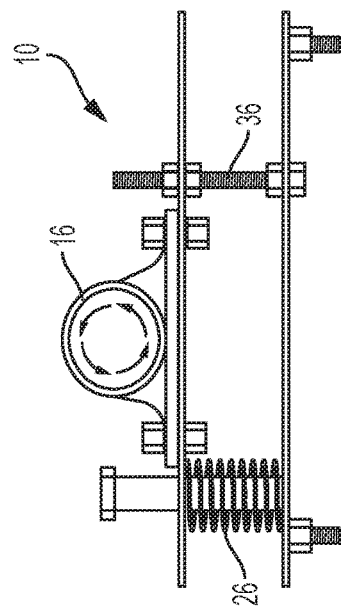

AMPLITUDE-MODULATING VIBRATOR FOR PREDICTIVE MAINTENANCE MODELING

TECHNICAL FIELD

The present disclosure relates to a vibration device configured to connect to a subject device to transfer vibrations thereto. The vibration device has various moveable components that can alter the vibration forces transmitted from the vibration device to the subject device.

BACKGROUND

It is well known that mechanical components are routinely tested to obtain data regarding their failure point. For example, the mechanical component may be subjected to an increasing force (e.g., vibration) until the component fails. Data regarding the magnitude of the force that caused the failure can be monitored across several tests. This process can be time consuming and expensive.

SUMMARY

According to one embodiment, a vibration device for generating various vibration signatures or characteristics is provided. The vibration device includes a lower plate having a lower elongated slot defined therein, and an upper plate spaced from the lower plate by a distance and having an upper elongated slot defined therein. A fastener connects the upper and lower plates and extends through the upper and lower elongated slots. The fastener is adjustable in a vertical direction to alter the distance between the lower plate and the upper plate, and is adjustable in a horizontal direction along the upper and lower slots. A vibrator is fastened to the upper plate via the upper elongated slot.

The adjustment of at least one of the following may alter the vibration signature of the vibration device: (1) an adjustment of the vibrator along the upper elongated slot, (2) an adjustment of the fastener in the vertical direction, and/or (3) an adjustment of the fastener in the horizontal direction.

In another embodiment, a system for supplying various vibration forces onto a subject device is provided. The system includes a lower plate configured to mount to the subject device, and an upper plate vertically spaced from the lower plate by a distance. The upper plate defines a pathway therein. An adjustable fastener connects the lower plate to the upper plate. The adjustable fastener is configured to alter the distance. A vibrator connects to the pathway and is configured to affix to the upper plate at various horizontal locations along the pathway. At least one of an adjustment of the vibrator along the track and an adjustment of the fastener to alter the distance alters vibration forces supplied by the vibrator to the subject device.

In yet another embodiment, a method for supplying various vibration forces onto a subject device is provided. The method includes activating a vibrator secured to an upper plate that is secured to a lower plate through an adjustment mechanism to supply a first vibration signature to a subject device. The method also includes adjusting the adjustment fastener to alter a distance between the upper plate and the lower plate to move the vibrator to a second position relative to the subject device. The method also includes activating the vibrator to supply a second vibration signature to the subject device while the vibrator is affixed in the second position relative to the subject device.

BRIEF DESCRIPTION OF THE DRAWINGS

FIG. 5A-5F are various configurations of the vibration device to generate different vibration patterns or forces to the subject device, according to various embodiments.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

As explained above, the current processes for testing mechanical components for their failure points can be expensive and time consuming. Data regarding vibration and temperature can be used to detect whether or not the mechanical component is working in normal condition, predict the failure mode, and predict when the mechanical component actually fails. The data may be collected continuously until several or all failure modes are captured. The data modeling is performed using experimentation or historical data under supervised learning. Testing involves either modifying the machine or adding multiple vibrators at different frequencies to obtain different amplitudes to replicate machine faults.

According to various embodiments of the present disclosure, vibrations are generated which replicate the mechanical component's failures by using a single vibration device configured to create vibrations at different frequencies and magnitudes. This is done, for example, by placing a vibrator on a specifically-designed mount rather than attaching it directly to the machine, as will be described below. Elimination of direct contact between the vibrator and the subject machine provides a vibration range that can be adjusted as desired. Teachings of this disclosure also allow elimination of the expensive and time-consuming process of waiting for the failure events to occur. Instead, vibrations are generated at different frequencies that can be used to replicate the faults. This replicated data can be used to build machine learning models for predictive maintenance of the mechanical device.

Figure 1:
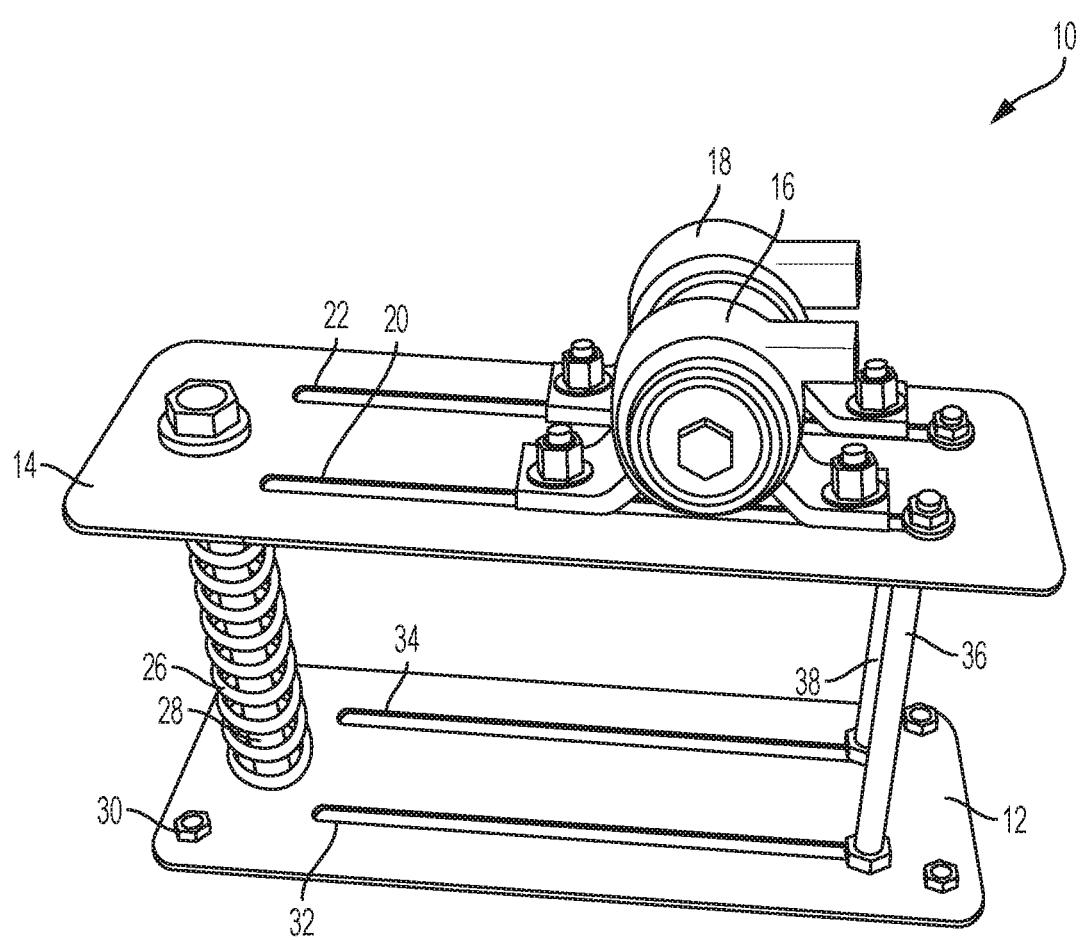
FIG. 1 is a front perspective view of a vibration device configured to mount to a subject device and provide various customizable or selectable vibration patterns to the subject device, according to one embodiment.
Figure 2:
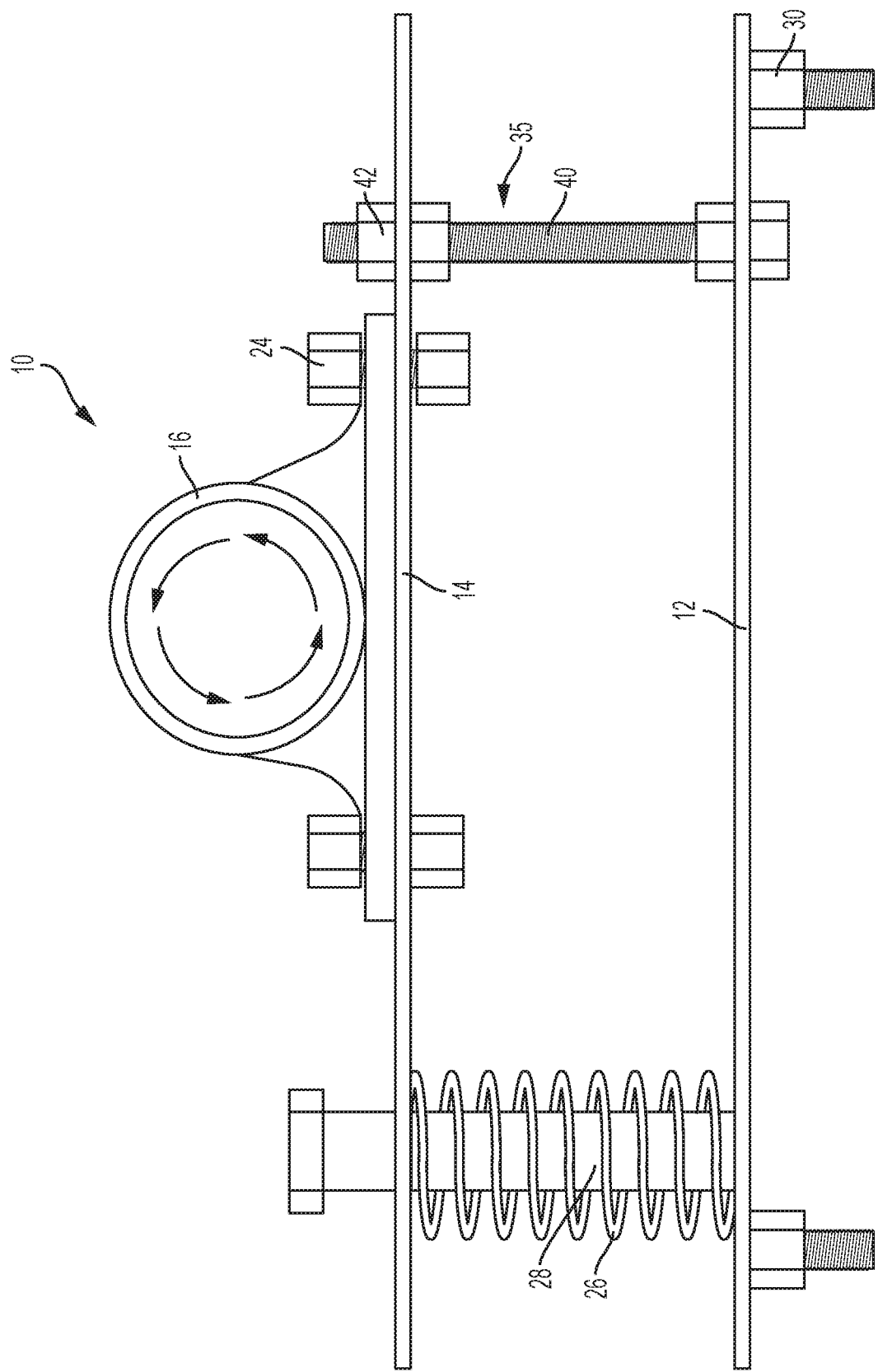
FIG. 2 is a front plan view of the vibration device of FIG. 1, according to one embodiment.
Figure 3:
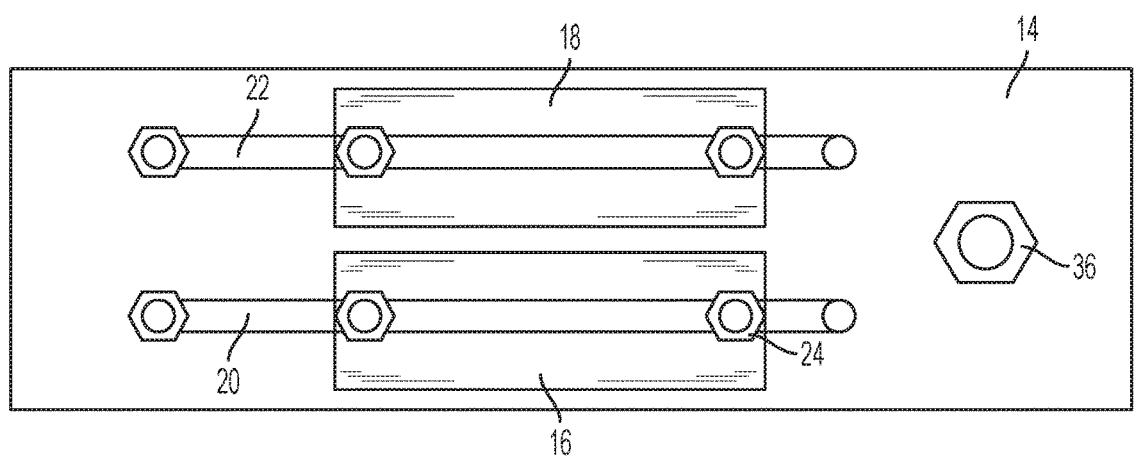
FIG. 3 is a top plan view of the vibration device of FIG. 1, according to one embodiment.
Figure 4:
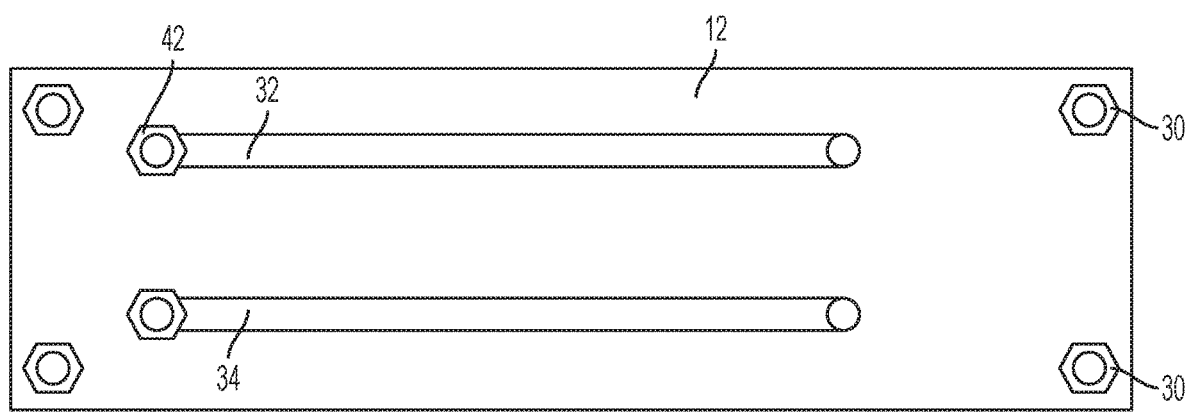
FIG. 4 is a bottom plan view of the vibration device of FIG. 1, according to one embodiment.

FIG. 1 shows a perspective view of one embodiment of a vibration device 10 described herein. FIG. 2 shows a front plan view of the vibration device 10, while FIGS. 3 and 4 show top and bottom plan views, respectively, of the vibration device 10. Referring to FIGS. 1-4, the vibration device 10 includes a lower plate 12 and an upper plate 14 spaced from the lower plate 12. In one embodiment, the plates 12, 14 are made of steel (e.g., gauge 11). The upper plate 14 supports a vibrator 16 that will be described below, while the lower plate is configured to mount to a subject device (not shown) such that the vibration signatures are transferred from the vibrator 16 to the subject device via the lower plate 12.

To accommodate the vibrator 16 and an optional second vibrator 18, the upper plate 14 is provided with a first track 20 (also referred to as an upper track or a first upper track) and a second track 22 (also referred to as an upper track or a second upper track). The tracks 20, 22 define a pathway for the vibrators 16, 18 to be slid along and attached to at various locations along the tracks. The tracks 20, 22 may be substantially identical, and therefore only the structure of the first track 20 will be described; duplicative structure may be provided for the second track 22. The track 20 may be a slot cut out or formed by the upper plate, such as the illustrated embodiment. Alternatively, the track 20 may include a guide rail or the like that extends upward from the top surface of the upper plate 14. Rather than a continuous slot or groove cut out of the upper plate 14, the track 20 may include a plurality of spaced apart apertures, providing a finite number (e.g., between 5-20) of points where the vibrator 16 can attach.

The vibrator 16 can be attached or secured to the upper plate 14 at various locations or positions along the track 20. In one embodiment, the vibration device 10 includes one or more fastener (e.g., bolt, nut, screw, etc.) 24 extending through the track 20 and at least a portion of the vibrator 16. When tightened and secured, the fastener mounts the vibrator 16 to the upper plate 14. To move the vibrator 16 in a horizontal direction along the upper plate 14, the fastener 24 may be loosened or removed, the vibrator may be transitioned to another location along the upper plate 14, and then the fastener 24 may be retightened or reattached to again mount the vibrator 16 to the upper plate 14.

Selective movement and repositioning of the vibrator 16 along the track 20 relative to the upper plate 14 is but one way of developing various vibration signatures (e.g., frequencies, amplitudes, etc.) for realization at the subject device. Other ways of doing so will be disclosed below, and are illustrated in FIGS. 5A-5F.

Referring back to FIGS. 1-4, a spring 26 is disposed between the lower plate 12 and the upper plate 14. The spring 26 can wrap around a rod 28 that connects the lower plate 12 and the upper plate 14. The rod 28 may be a screw, bolt, etc. that extends through the upper plate 12. The upper plate 14 may be freely supported by the spring 26 beneath, allowing the upper plate 14 to slide up and down the rod 28 and bounce on the spring 26 while the vibrator 16 is in operation.

The lower plate 12 may also include a plurality of mounting fasteners 30 (e.g., screws, bolts, etc.) to mount the lower plate 12 to the subject device (not shown).

Like the upper plate 14, the lower plate 12 may also include a first track 32 (also referred to as a lower track or a first lower track) and a second track 34 (also referred to as a lower track or a second lower track). The tracks 32, 34 may have identical or similar structure as the tracks in the upper plate 14. While two tracks are shown on either of the upper plate and lower plate, it should be understood that other embodiments only have a single track on each plate.

The vibration device 10 also includes at least one adjustable fastener 36. The adjustable fastener 36 can extend through the first lower track 32 in the lower plate 12, and the first upper track 20 in the upper plate 14. A second adjustable fastener 38 can also be provided, extending through the second lower track 34 in the lower plate 12 and the second upper 22 track in the upper plate 14. The adjustable fasteners 36, 38 may be identical in structure and function, and therefore description of one of the fasteners can equally apply to the other fastener. More than two fasteners may be provided.

The adjustable fastener 36 is configured to alter a distance or height between the lower plate 12 and the upper plate 14. In one embodiment, the adjustable fastener 36 includes a threaded shaft 40 and at least one nut 42. In the illustrated embodiment, two nuts may be placed on either side of each plate 12, 14. To fix the upper plate 14 at a particular distance from the lower plate 12, the nuts 42 may be tightened to hold against the upper plate 14. To change the distance between the plates, the nuts 42 may be loosened, the upper plate 14 can be raised or lowered relative to the lower plate 12, and the nuts 42 can then be re-tightened to fix the upper plate 14 in the new position.

As the upper plate 14 is moved to various distances from the lower plate 12, the spring 26 can compress or expand. Doing so changes the characteristics of the spring 26 as vibrations are transferred from the vibrator 16 to the lower plate 12 and eventually to the subject device. The adjustment of the adjustable fastener 36 to alter the distance between the upper and lower plates is another way of developing various vibration signatures (e.g., frequencies, amplitudes, patterns, etc.) for realization at the subject device.

The adjustable fastener 36 is also translatable through or along the upper track 20 and the lower track 32. This allows the adjustable fastener 36 to assume various horizontal positions along the tracks relative to the plates 12, 14. To fix the upper plate 14 at a particular horizontal position, the nuts 42 may be tightened to hold against the upper plate 14. To change the particular horizontal position (i.e., to move the adjustable fastener 36 from a first location to a second location along the tracks 20, 32), the nuts 42 may be loosened, the threaded shaft 40 may be slid along and through the tracks 20, 32, and the nuts 42 can then be re-tightened to fix the upper plate 14 in the new position.

The adjustment of the adjustable fastener 36 to alter the horizontal positioning of the adjustable fasteners 36, 38 is another way of developing various vibration signatures (e.g., frequencies, amplitudes, patterns, etc.) for realization at the subject device. For example, this changes the location of vibration and force transfer from the upper plate 14 to the lower plate 12 during its travel to the subject device.

In an embodiment in which two or more vibrators are utilized, such as the first vibrator 16 and the second vibrator 18, the vibrators may be operating in identical or reversed rotational directions. For example, each vibrator may be a pneumatic vibrator that utilizes compressed air to move ball bearing around a track in a rotational direction to create vibration. According to this disclosure, the rotational direction of one or both of the vibrators 16, 18 may be changed to alter the vibration signatures realized at the subject device. For example, the first vibrator 18 may be removed from the upper plate 14 by loosening or removing the fastener 24, reversed in direction or orientation, and reattached to the upper plate 14 by tightening the fastener 24.

With this configuration, the first and second vibrators 16, 18 cause their internal components (e.g., ball bearings) to rotate in opposite directions relative to each other.

The disclosure above has described four examples of changing the vibration forces or vibration signatures (e.g., frequencies, amplitudes, patterns, etc.) realized at the subject device. First, the vibrator 16 may move horizontally along the upper track 20 of the upper plate 14. Second, the distance or height between the lower plate 12 and the upper plate 14 can be adjusted via the adjustable fastener 36. Third, the adjustable fastener 36 can move horizontally along the upper and lower tracks 20, 32. And fourth, at least one of the vibrators can be reversed to alter the rotational direction of its internal components. Some of these methods are exemplified in FIGS. 5A-5F.

FIG. 5A shows the vibration device 10 assuming a first configuration to develop a first vibration characteristic to the subject device. This first position is similar to the position shown in FIGS. 1 and 2. The vibrator 16 is at a location toward the adjustable fastener 36, away from the spring 26.

FIG. 5B shows the vibration device 10 assuming a second configuration to develop a second vibration characteristic to the subject device. In the second configuration, the vibrator 16 has been translated along the upper track 20 to move to a position closer to the spring 26.

FIG. 5C shows the vibration device 10 assuming a third configuration to develop a third vibration characteristic to the subject device. In the third configuration, the vibrator 16 has returned to its original position along the upper track 20. The adjustable fastener 36 has been adjusted to reduce the distance or height between the lower and upper plates 12, 14.

FIG. 5D shows the vibration device 10 assuming a fourth configuration to develop a fourth vibration characteristic to the subject device. In the fourth configuration, the vibrator 16 has been translated along the upper track 20 to move to a position closer to the spring 26 relative to its positioning in FIG. 5C.

FIG. 5E shows the vibration device 10 assuming a fifth configuration to develop a fifth vibration characteristic to the subject device. In the fifth configuration, the adjustable fastener 36 has been adjusted to return the distance between the plates 12, 14 to its original distance (e.g., shown in FIGS. 5A-5B). And, the adjustable fastener 36 has been translated along the upper and lower tracks 20, 32 to reduce the distance between the adjustable fastener 36 and the spring 26.

FIG. 5F shows the vibration device 10 assuming a sixth configuration to develop a sixth vibration characteristic to the subject device. In the sixth configuration, the adjustable fastener 36 has been adjusted to reduce the distance between the plates 12, 14.

The various configurations shown in FIGS. 5A-5F are merely examples. The various components can be moved in different combinations to develop even more vibration characteristics. And, the adjustment fastener can be adjusted to varying selectable horizontal and vertical positions, not just the those shown in the Figures.

Utilizing the teachings above, a method for supplying various vibration forces onto the subject device may include changing the orientation or positioning of the various components of the vibration device. In one example, the vibrator 16 is activated to supply a first vibration signature or characteristic to the subject device. The adjustment fastener 36 can be adjusted to alter a distance between the upper plate 14 and the lower plate 12, which moves the vibrator to a second position relative to the subject device. Alternatively or in combination, the adjustable fastener 36 can be adjusted horizontally along the tracks 20, 32 to alter the distance between the adjustable fastener 36 and the spring 26. This can move the vibrator to a third position relative to the subject device. Then, the vibrator 16 may be again activated to supply a different vibration signature to the subject device.

It should be understood that sonic of the components can be rearranged or redesigned to perform the same or similar function as those disclosed. For example, while the adjustable fastener 36 disclosed herein is adjustable in the horizontal and vertical directions, in another embodiment there are two separate adjustable fasteners provided: a first adjustable fastener for adjusting the distance between the plates, and a second adjustable fastener for adjusting the horizontal distance between the second adjustable fastener and the spring. Also, the rod 28 is not situated within the spring 26, but they are instead connected at two different locations between the upper and lower plates.

While exemplary embodiments are described above, it is not intended that these embodiments describe possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manageability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A vibration device for generating various vibration signatures, the vibration device comprising:
   a lower plate having a lower elongated slot defined therein;
   an upper plate spaced from the lower plate by a distance and having an upper elongated slot defined therein;
   a fastener connecting the upper and lower plates and extending through the upper and lower elongated slots, wherein the fastener is adjustable in a vertical direction to alter the distance between the lower plate and the upper plate, and wherein the fastener is adjustable in a horizontal direction along the upper and lower slots; and
   a vibrator fastened to the upper plate via the upper elongated slot.

2. The vibration device of claim 1, wherein adjustment of at least one of the following alters the vibration signature of the vibration device:
   an adjustment of the vibrator along the upper elongated slot,
   an adjustment of the fastener in the vertical direction, and
   an adjustment of the fastener in the horizontal direction.

3. The vibration device of claim 1, further comprising an additional fastener configured to fasten the lower plate to a subject device such that the vibration signatures are transferred from the vibration device to the subject device.

4. The vibration device of claim 1, further comprising a spring extending between the lower plate and the upper plate.

5. The vibration device of claim 1, wherein the lower plate includes a second lower elongated slot, the upper plate includes a second upper elongated slot, and the vibration device further includes a second fastener extending through second lower elongated slot and second upper elongated slot and couples the lower plate to the upper plate.

6. The vibration device of claim 5, further comprising a second vibrator fastened to the upper plate via the second upper elongated slot.

7. The vibration device of claim 6, wherein the vibrator and the second vibrator each have an internal component configured to rotate in opposite directions from each other.

8. A system for supplying various vibration forces onto a subject device, the system comprising:
   a lower plate configured to mount to the subject device;
   an upper plate vertically spaced from the lower plate by a distance, the upper plate defining a pathway therein;
   an adjustable fastener connecting the lower plate to the upper plate, the adjustable fastener configured to alter the distance; and
   a vibrator connected to the pathway and configured to affix to the upper plate at various horizontal locations along the pathway;
   wherein at least one of an adjustment of the vibrator along the pathway and an adjustment of the fastener to alter the distance alters vibration forces supplied by the vibrator to the subject device.

9. The system of claim 8, wherein the fastener is adjustable in a horizontal direction along the pathway to alter the vibration threes supplied by the vibrator to the subject device.

10. The system of claim 8, further comprising a spring extending between the lower plate and the upper plate.

11. The system of claim 8, wherein the pathway includes a first slot, and Wherein the lower plate includes a second slot aligned with the first slot.

12. The system of claim 11, wherein the adjustable fastener extends through the first and second slots, and wherein the adjustable fastener is adjustable in a vertical direction to alter the distance and is adjustable in a horizontal direction through the slots.

13. The system of claim 12, wherein the upper plate defines a third slot and the lower plate defines a fourth slot aligned with the third slot.

14. The system of claim 13, further comprising a second adjustable fastener extending through the third and fourth slots and adjustable in the vertical and horizontal directions.

15. The system of claim 13, further comprising a second vibrator connected to the upper plate along the third slot.

16. A method for supplying various vibration forces onto a subject device, the method comprising:
   activating a vibrator secured to an upper plate that is secured to a lower plate through an adjustment mechanism to supply a first vibration signature to a subject device;
   adjusting the adjustment mechanism to alter a distance between the upper plate and the lower plate to move the vibrator to a second position relative to the subject device; and
   activating the vibrator to supply a second vibration signature to the subject device while the vibrator is affixed in the second position relative to the subject device.

17. The method of claim 16, wherein the upper plate includes a track, and wherein the method further comprises activating the vibrator to supply a third vibration signature to the subject device while the adjustment mechanism is secured to the upper plate in a second location along the track.

18. The method of claim 16, wherein the adjusting of the adjustment mechanism includes rotating a screw or nut.

19. The method of claim 16, wherein the upper plate includes a track, and wherein the method further comprises activating the vibrator to supply a third vibration signature to the subject device while the vibrator is secured in a second location along the track.

20. The method of claim 19, wherein the track in the upper plate is an elongated slot defined by the upper plate.

* * * * *